United States Patent [19]

Sakakima et al.

[11] Patent Number: 4,578,728
[45] Date of Patent: Mar. 25, 1986

[54] MAGNETIC HEAD

[75] Inventors: Hiroshi Sakakima; Mitsuo Satomi; Yukihiro Yanagiuchi, all of Osaka; Harufumi Senno, Nara, all of Japan

[73] Assignee: Matsushita Electric Industrial Co., Ltd., Osaka, Japan

[21] Appl. No.: 445,721

[22] Filed: Nov. 30, 1982

[30] Foreign Application Priority Data

Dec. 9, 1981 [JP] Japan .................. 56-196909
Dec. 29, 1981 [JP] Japan .................. 56-212873

[51] Int. Cl.$^4$ ............................ G11B 5/127
[52] U.S. Cl. .................. 360/125; 148/31.55; 360/127; 420/435
[58] Field of Search .................. 360/122, 125–127, 360/110; 148/31.55, 403; 420/435–440

[56] References Cited

U.S. PATENT DOCUMENTS

| | | | |
|---|---|---|---|
| 3,795,954 | 3/1974 | Alex | 29/603 |
| 4,187,128 | 2/1980 | Billings | 148/31.55 X |
| 4,246,620 | 1/1981 | Kaminaka | 360/127 |
| 4,298,899 | 11/1981 | Argumedo | 29/603 X |
| 4,306,908 | 12/1981 | Takayama | 420/435 X |
| 4,416,709 | 11/1983 | Ohya | 148/31.55 X |

FOREIGN PATENT DOCUMENTS

WO81/00861 4/1981 PCT Int'l Appl. .................. 148/403

Primary Examiner—A. J. Heinz
Attorney, Agent, or Firm—Burgess, Ryan & Wayne

[57] ABSTRACT

The invention provides a magnetic head having a core which includes a thin amorphous alloy film having a composition of $Co_aM_bT_cX_d$, for $70 \leq a \leq 95$, $0 \leq b \leq 20$, $3 \leq c \leq 20$, $0 \leq d < 10$, and $a+b+c+d=100$, where M is at least one metal selected from the group consisting of Fe, Ni, Cr, Mo, W and Mn, T is at least one metal selected from the group consisting of Ti, Zr, Hf, Nb and Ta, and X is at least one material selected from the group consisting of Si, B, C, Al and Ge; and a substrate having excellent resistance to wear and having the thin amorphous alloy film on a major surface thereof, wherein the thin amorphous alloy film is located at least in a portion adjacent a magnetic gap portion of the core which slidably contacts a magnetic recording medium is made of an amorphous alloy.

8 Claims, 17 Drawing Figures

FIG. 5A
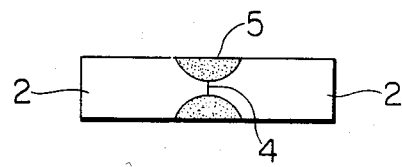
FIG. 5B  FIG. 5C
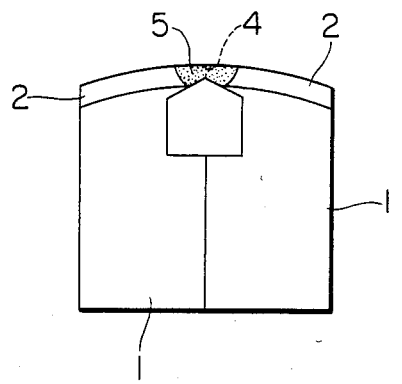 
FIG. 6A
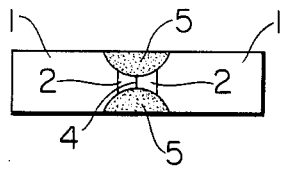
FIG. 6B  FIG. 6C
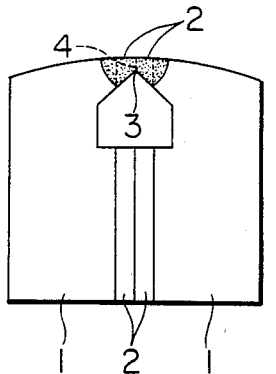 

MAGNETIC HEAD

BACKGROUND OF THE INVENTION

I. Field of the Invention

The present invention relates to a magnetic head having excellent electromagnetic transduction characteristics and excellent resistance to wear and to corrosion.

II. Description of the Prior Art

Conventionally, Permalloy, Sendust and ferrite are used as magnetic head core materials, respectively, each of which has advantages and disadvantages. A magnetic head core material has not been provided which satisfies the requirement for both excellent resistance to wear and excellent magnetic characteristics. Meanwhile, along with the development of liquid quenching techniques, amorphous magnetic alloys having excellent magnetic characteristics have been recently developed. Among these amorphous magnetic alloys, there are typically known a metal-metalloid alloy such as $Fe_4Co_{71}Si_{10}B_{15}$ and a metal-metal alloy such as $Co_{80}Mo_{10}Zr_{10}$. The former alloy can be readily mass-produced in air, whereas the latter must be prepared in an inert gas atmosphere or in a vacuum since the metal-metal alloy tends to be oxidized in air. It is known that the above alloys are suitable for magnetic head core materials used for a VTR magnetic head which is operated in a high frequency range, since these alloys show similar characteristics to ferrite even though they are metals. However, only a very thin film having a thickness of 20 to 50 μm may be prepared using the above alloys. Therefore, these alloys have poor workability for forming the magnetic head. Furthermore, the wear resistance of the above-mentioned alloys is the same as or lower than that of Sendust, and is significantly lower than that of ferrite. Therefore, the metal-metalloid and metal-metal alloys have never been used in place of Sendust as materials for forming magnetic heads in practice.

SUMMARY OF THE INVENTION

It is an object of the present invention to provide a magnetic head which eliminates the conventional drawbacks and has excellent resistance to wear together with excellent electromagnetic transduction characteristics.

The core of the magnetic head according to the present invention includes a substrate having excellent resistance to wear, and a thin amorphous alloy film which is formed on a major surface of the substrate and has excellent resistance to wear, a high saturation flux density, and excellent electromagnetic transduction frequency characteristics.

The thin amorphous alloy film has a general formula $Co_aM_bT_cX_d$ having Co as the major component, where M is at least one metal selected from the group consisting of Fe, Ni, Cr, Mo, W and Mn, T is at least one metal selected from the group consisting of Ti, Zr, Hf, Nb and Ta, and X is at least one material selected from the group consisting of Si, B, C, Al and Ge, for $70 \leq a \leq 95$, $0 \leq b \leq 20$, $3 \leq c \leq 20$, $0 \leq d \leq 10$, and $a+b+c+d=100$.

When the conditions $5 \leq c \leq 20$ and $d=0$ are given, maximum resistance to wear can be accomplished. The thin amorphous alloy film is located at least in a portion adjacent a magnetic gap of the magnetic core. The magnetic gap portion contacts a magnetic recording medium.

According to an aspect of the present invention, the magnetic head has a structure in which a plurality of thin amorphous alloy films are prepared and each of a plurality of thin ceramic films, which are respectively thinner than the thin amorphous alloy films and have excellent resistance to wear, is sandwiched between adjacent thin amorphous alloy films, thereby improving resistance to wear.

According to another aspect of the present invention, the magnetic head has a structure in which a thin amorphous alloy film is sandwiched between substrates which have excellent resistance to wear in order to improve the resistance to wear of the thin amorphous alloy film.

Other objects, features, and advantages of the present invention will be apparent from the following description taken in conjunction with the accompanying drawings.

BRIEF DESCRIPTION OF THE DRAWINGS

FIG. 5A is a front view of a magnetic head having a structure in which a surface of a substrate which is adapted to contact an amorphous alloy is polished and is of an arcuated shape, and an amorphous alloy is sputtered onto the arcuated surface of the substrate according to a third embodiment of the present invention, FIG. 5B is a plan view thereof, and FIG. 5C is a side view thereof;

FIG. 6A is a front view of a magnetic head having a structure in which an amorphous alloy is sputtered only in the vicinity of a gap portion according to a fourth embodiment of the present invention, FIG. 6B is a plan view thereof, and FIG. 6C is a side view thereof;

DETAILED DESCRIPTION OF THE PREFERRED EMBODIMENTS

Figure 1:
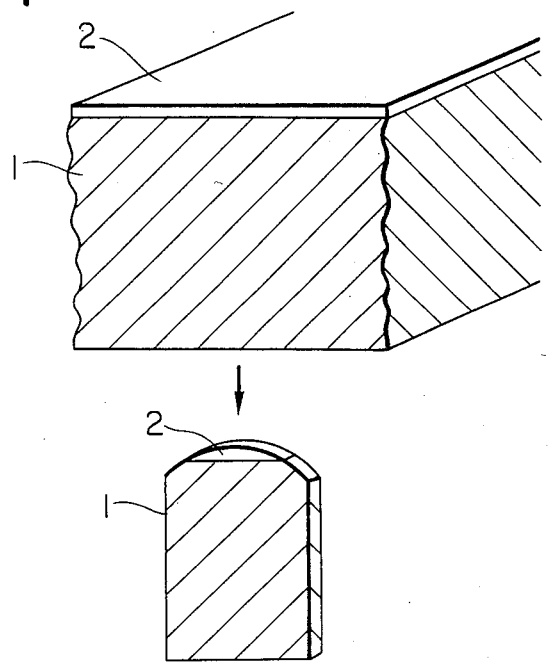
FIG. 1 is a schematic view showing the process for forming an anti-wear dummy head, and also showing the head structure which has an amorphous alloy film on a surface which contacts a recording medium.

A multilayer comprising a substrate, having excellent resistance to wear, and an amorphous alloy film formed on the substrate and having excellent resistance to wear and a high saturation flux density is used as a core, since the magnetic head core must be formed by a material having a high saturation flux density, a high permeability, and excellent resistance to wear. The multilayer is obtained by sputtering the amorphous alloy onto the substrate. In general, deposition and flame spraying are used to prepare a multilayer of an amorphous alloy and a magnetic material such as a ceramic, ferrite, or Sendust having excellent resistance to wear. Deposition does not allow easy control of the composition and is not suitable for an amorphous alloy which causes magnetostriction in accordance with the composition ratio. Furthermore, according to experiment, it is found that ferrite and a deposited film thereon tend to peel apart. Flame spraying is not suitable either for a metal-metal amorphous alloy which is readily oxidized since a temperature rise of the substrate is significant and alloy powders are melted by a high-temperature flame.

In general, the amorphous alloy has a high saturation flux density and a low resistance to wear, as compared with ferrite. However, a specific amorphous alloy sputtered on a substrate has an excellent resistance to wear which is three to five times that of Sendust. Such an amorphous alloy can be represented by the following formula:

$$Co_a M_b T_c X_d$$

for $70 \leq a \leq 95$, $0 \leq b \leq 20$, $3 \leq c \leq 20$, $0 \leq d \leq 10$, and $a+b+c+d=100$
where
M is at least one material selected from the group consisting of Fe, Ni, Cr, Mo, W and Mn,
T is at least one material selected from the group consisting of Ti, Zr, Hf, Nb and Ta, and
X is at least one material selected from the group consisting of Si, B, C, Al and Ge.

In order to obtain an amorphous alloy, at least the two conditions $70 \leq a \leq 95$ and $3 \leq c \leq 20$ must be satisfied. M is an additive which is used to adjust magnetostriction, improve resistance to wear and widen the range for forming the amorphous alloy. It is also found preferable that Cr, Mo and/or W are contained in a total amount of less than 20%, respectively, so as not to inadvertently lower the magnetic flux density, and that Fe, Ni and Mn are preferably contained in a total amount so as not to deviate magnetostriction from zero. X is effectively used to widen the range for forming the amorphous alloy. However, it is found that when X is added in an amount exceeding 10%, resistance to wear is degraded.

Based upon the above facts, the present inventors have made extensive studies of a metal magnetic head having a higher resistance to wear and a higher saturation flux density. It was found that resistance to wear of a magnetic head obtained by sandwiching an amorphous alloy magnetic film which is brought into slidable contact with a magnetic recording medium between ceramic plates having excellent resistance to wear is the same as or higher than that of the conventional ferrite head. In this case, one of the important problems is a difference in degree of wear between the ceramic portion and the amorphous alloy portion. When the above magnetic head is used for a VTR, even if a difference in degree of wear between the two portions is only 0.1 μm, a spacing loss occurs since the recording signal has a short wavelength, thus greatly decreasing an output.

According to experiments conducted by the present inventors, even if an amorphous alloy is sandwiched between substrates of a material such as $Al_2O_3$, forsterite or barium titanate having excellent resistance to wear, the following conditions must be satisfied to obtain an amorphous alloy having a negligible difference in degree of wear from that of the substrates in practice. Such an amorphous alloy does not contain X, that is, a metalloid such as Si or B and thus has a formula:

$$Co_a M_b T_{c'}$$

for, $70 \leq a \leq 95$, $0 \leq b \leq 20$, $5 \leq c' \leq 20$ and $a+b+c'=100$
where
M is at least one material selected from the group consisting of Fe, Ni, Cr, Mo, W and Mn, and
T is at least one material selected from the group consisting of Nb, Zr, Ti, Ta and Hf.

The above relations for a and c' are required to be satisfied in forming an amorphous alloy. Furthermore, saturation flux density $B_s$ of the obtained metal magnetic head can be higher than that of the ferrite magnetic head if the condition $a \geq 75$ is satisfied.

M is an additive which effectively adjusts the magnetostriction and does not prevent formation of an amorphous alloy. Fe and/or Mn are added in a total amount of less than 20% so as not to deviate the magnetostriction greatly to a positive value, and other materials are also added in a total amount of 20% so as not to decrease the saturation flux density $B_s$. Furthermore, if a component T such as Ta or Hf is incorporated, the resulting magnetic head is obtained at a high cost. Therefore, the amount of the component T is limited within an allowable range. When a magnetic head containing a component T essentially consisting of Ti has a high saturation flux density $B_s$, this magnetic head has a crystallization temperature as low as 400° C. Therefore, such a magnetic head is not suitable for adhering glass on the gap surface thereof. As a result, from the viewpoints of manufacturing cost and workability, component T must in practice consist of Nb and/or Zr.

In addition to the above conditions, resistance to corrosion is one of the important requirements of the magnetic head core material. Nb is a useful material for improving resistance to corrosion. Zr has poor resistance to corrosion. Therefore, at least one of Cr, Nb, Ta and Ti may be added to improve resistance to corrosion. Sputtered Co-Nb has a negative magnetostriction, whereas sputtered Co-Zr has a positive magnetostriction. In this case, a proper total amount of Fe, Mn, Ni, Cr, Mo and W is added to decrease the magnetostriction. Thus, two compositions having the formulas below are concluded to be suitable for the magnetic core material.

(A) $Co_x Nb_y M'_z T'_u$
for, $75 \leq x \leq 92$, $8 \leq y \leq 20$, $0.1 \leq z \leq 10$, $0 \leq u \leq 5$, and $x+y+z+u=100$
where
M' is at least one material selected from the group consisting of Fe, Ni, Cr, Mo, W and Mn, and
T' is at least one material selected from the group consisting of Zr, Ta and Ti.

(B) $Co_xZr_yM''_zT''_u$ for $75 \leq x \leq 90$, $5 \leq y \leq 12$, $0.1 \leq z \leq 10$, $5 \leq u \leq 10$, and $x+y+z+u=100$ where M'' is at least one material selected from the group consisting of Fe, Ni, Mo, W and Mn, and T'' is at least one material selected from the group consisting of Ti, Cr, Ta and Nb.

In the composition of formula (A), more than 8% of Nb is required to obtain a sufficient resistance to corrosion. Therefore, the conditions $x \leq 92$ and $8 \leq y$ must be satisfied. Furthermore, T'=Zr and/or Ta is effectively used to increase the crystallization temperature. However, since Zr degrades resistance to corrosion, Ta is expensive, and Zr and Ta cause a decrease in the saturation flux density $B_s$, they must be added in an amount less than 5%. M' is effectively used to eliminate the magnetostriction. In particular, when Nb is used, a combination with Fe or Mn is most effective. However, any other combination of M' may be used to decrease the magnetostriction.

In the composition of formula (B), more than 5% of Cr, and more than 8% of Ti, Ta and/or Nb are added to obtain a sufficient resistance to corrosion. However, these materials cause a decrease in the saturation flux density $B_s$. Therefore, they must be limited to an amount less than 10%. If Zr is more than 5%, a Co-Zr amorphous film can be obtained. Since more than 5% of Ti, Cr, Ta and/or Nb are added as described above, the Zr content must be less than 12% so as not to allow excess decrease in the saturation flux density $B_s$. M'' is required to adjust the magnetostriction in the same manner as is M'. The Co-Zr alloy has a positive magnetostriction, so that Ni, Mo and W are effectively used. Examples of the present invention will be described in detail hereinafter.

EXAMPLE 1

After a vacuum chamber was evacuated to a pressure of $3 \times 10^{-7}$ Torr, Ar gas was introduced to a pressure of $2 \times 10^{-2}$ Torr. Various amorphous alloys were sputtered for about 5 hours onto an Mn-Zn ferrite substrate which was mirror-polished and sufficiently cleaned. The thickness of the sputtered amorphous alloy films was measured by a gauge to be about 10 μm. As shown in FIG. 1, each multilayer having an Mn-Zn ferrite substrate 1 and an amorphous alloy film 2 formed thereon was formed into a head chip. The head chip was then mounted on a VTR head cylinder, and its wear was measured by operating the VTR. The tape used here was a Co-ferrioxide tape, and a relative speed between the head and the tape was about 5.6 m/sec. Results are shown in Table 1. The saturation flux density $B_s$ of each magnetic head was measured using the same amorphous alloy film sputtered on a glass substrate, using a VSM.

TABLE 1

| Head material | $B_s$ (Gauss) | Wear of head after 100 hours of tape travel (μm) |
| --- | --- | --- |
| *Sendust (bulk) | 8700 | 12 |
| *Mn—Zn ferrite | 4500 | 2 |
| Amorphous alloy sputtered film | | |
| $Co_{80}Mo_{10}Zr_{10}$ | 6200 | 3 |
| $Co_{80}Cr_{10}Zr_{10}$ | 6500 | 3 |
| $Co_{83}W_6Zr_{11}$ | 6800 | 2 |
| $Co_{79}Ni_{11}Zr_{10}$ | 9900 | 5 |

TABLE 1-continued

| Head material | $B_s$ (Gauss) | Wear of head after 100 hours of tape travel (μm) |
| --- | --- | --- |
| $Co_{80}Ti_{20}$ | 7500 | 3 |
| $Co_{86}Ta_{14}$ | 11400 | 3 |
| $Co_{90}Hr_{10}$ | 11000 | 3 |
| $Co_{86}Nb_{14}$ | 10200 | 3 |
| $Fe_4Co_{80}Nb_{14}B_2$ | 9500 | 4 |
| $Mn_5Co_{79}Nb_{14}B_2$ | 9000 | 4 |
| $Co_{81}Nb_{14}B_5$ | 7500 | 5 |
| $Co_{81}Nb_{14}C_3B_2$ | 7800 | 4 |
| $Co_{81}Nb_{14}Si_3B_2$ | 7000 | 4 |
| $Co_{81}Nb_{14}Al_3B_2$ | 7500 | 4 |
| $Co_{81}Nb_{14}Ge_3B_2$ | 7000 | 5 |
| $Co_{80}Ti_{10}Zr_{10}$ | 8600 | 3 |
| $Co_{80}Ti_{12}B_8$ | 8800 | 6 |
| $Co_{75}Mo_{20}Zr_5$ | 5500 | 3 |
| $Co_{70}Mo_{10}W_8Zr_3B_9$ | 5000 | 6 |
| $Co_{95}Zr_5$ | 14500 | 7 |
| *$Co_{80}Ti_{10}B_{10}$ | 9000 | 12 |
| *$Co_{74}Ti_{10}B_{16}$ | 6800 | 15 |
| *$Co_{74}Ti_6B_{20}$ | 8000 | 17 |
| *$Fe_4Co_{71}Si_{10}B_{15}$ | 7500 | 32 |
| *$Fe_{78}Si_{10}B_{12}$ | 15000 | 28 |
| *$Fe_{80}P_{13}C_7$ | 14000 | 52 |
| *$Fe_{40}Ni_{40}P_{14}B_6$ | 8000 | 77 |

*Head material of the present invention not used

As may be apparent from the results shown in Table 1, the amorphous alloys according to the present invention have excellent resistance to wear. Although each of these amorphous alloys has Co as its major component, a relatively large amount of active metals such as Nb, Ta, Ti, Zr, and Hf is also present. Therefore, it is very difficult to prepare these alloys in air. When the amorphous alloy is prepared by quenching, the active metals must be treated in a vacuum or in an inert gas atmosphere. Since a sputtering apparatus does not have disadvantages over a quenching apparatus whose nozzle may be easily damaged in the case of forming the above amorphous alloy, and since the metals are sputtered on a substrate having excellent resistance to wear, a bulk multilayer can be formed which allows better workability than the thin strip of a ribbon-shaped obtained by quenching.

EXAMPLE 2

Figure 2A:
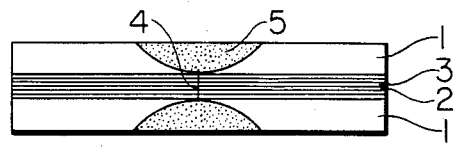
FIG. 2A is a front view of a magnetic head having a sandwich structure in which an amorphous alloy and $SiO_2$ are alternately sputtered onto a ferrite substrate and are then covered with another ferrite substrate according to a first embodiment of the present invention.
Figure 2B:
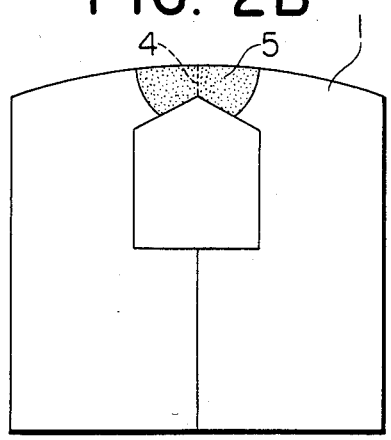
FIG. 2B is a plan view thereof.
Figure 2C:
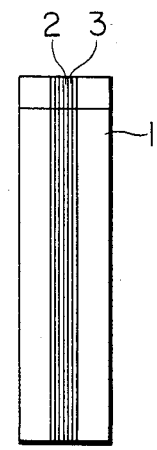
FIG. 2C is a side view thereof.

$Co_{80}Cr_{10}Zr_{10}$ was formed by sputtering on an Mn-Zn ferrite substrate to a thickness of 6 μm using the same process as in Example 1. Thereafter, $SiO_2$ was deposited by sputtering on the $Co_{80}Cr_{10}Zr_{10}$ film to a thickness of 0.02 μm. The above sputtering operation was repeated to form a sandwich structure having a thickness of 31 μm. Finally, another Mn-Zn ferrite substrate was adhered to the surface of the sandwich structure to prepare a practical magnetic head as shown in FIG. 2. Reference numeral 1 denotes a ferrite substrate; 2, an amorphous alloy film; 3, an $SiO_2$ film; 4, a magnetic gap portion formed by $SiO_2$; and 5, a glass portion obtained by partially removing the ferrite substrate 1 and embedding glass in place of a removed portion. In the same process as described above, $Al_2O_3$ was sputtered in place of $SiO_2$, and a magnetic head was prepared by using $Fe_4Co_{77}Nb_{14}B_5$ in place of $Co_{80}Cr_{10}Zr_{10}$. Magnetic transduction characteristics and resistance to wear of the obtained magnetic heads were measured, and results are shown in Table 2 and FIG. 3.

TABLE 2

| Head core material | Insulating material | Wear of head after 1000 hours of tape travel ($\mu$m) |
| --- | --- | --- |
| $Co_{80}Cr_{10}Zr_{10}$ | None | 3 |
|  | $SiO_2$ | 2 |
|  | $Al_2O_3$ | 1 |
| $Fe_4Co_{77}Nb_{14}B_5$ | None | 5 |
|  | $SiO_2$ | 3 |
|  | $Al_2O_3$ | 2 |

Figure 3:
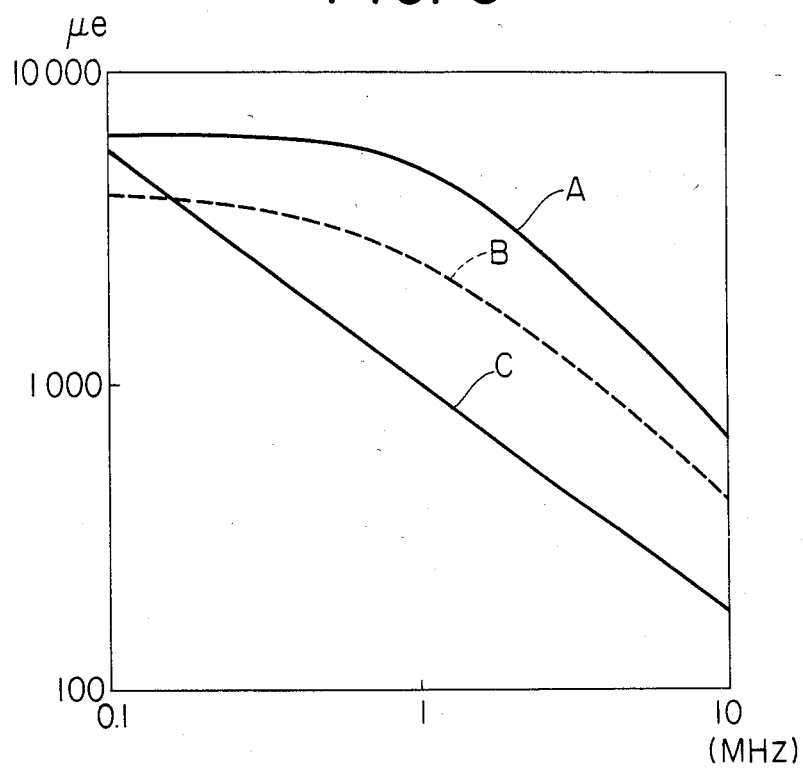
FIG. 3 is a graph for explaining the permeability of three types of magnetic material as a function of the frequency so as to show the frequency characteristics of the magnetic materials.

FIG. 3 shows the relationship between the permeability and the frequency of various materials to explain the frequency characteristics thereof. Curve A shows the frequency characteristics of an amorphous alloy $Fe_4Co_{77}Nb_{14}B_5$ of a sandwich structure having a total thickness of 31 $\mu$m in which the $SiO_2$ or $Al_2O_3$ film having a thickness of 0.2 $\mu$m is sandwiched between adjacent $Fe_4Co_{77}Nb_{14}B_5$ films each having a thickness of 6 $\mu$m. Curve B shows the frequency characteristics of the ferrite substrate having a thickness of 100 $\mu$m. Curve C shows the frequency characteristics of the $Fe_4Co_{77}Nb_{14}B_5$ amorphous films having a total thickness of 30 $\mu$m without having either $SiO_2$ or $Al_2O_3$ insulating films sandwiched therebetween.

As may be apparent from the results shown in Table 2 and FIG. 3, sputtered $SiO_2$ and $Al_2O_3$ serve to improve frequency characteristics and resistance to wear.

EXAMPLE 3

Mn-Zn ferrite and Sendust were selected as the substrates to be sputtered, and magnetic heads were prepared using the same process as in Example 2. Output characteristics were measured for these magnetic heads and for the conventional Mn-Zn ferrite magnetic head. A metal tape having a coercive force $H_c$ of 1,100 Oe was used as a test tape. Recording/playback sensitivity was measured for the magnetic head of the present invention and for the conventional magnetic head by recording and playing back a reference signal of 8 MHz. Comparative results are shown in Table 3.

TABLE 3

|  | Head core material |  | Insulating interlayer material | Recording/playback sensitivity |
| --- | --- | --- | --- | --- |
| Conventional head | Mn—Zn ferrite |  | None | 0 dB |
| Head | Substrate | Amorphous alloy |  |  |
| of the | MnZn ferrite | $Co_{80}Cr_{10}Zr_{10}$ | $Al_2O_3$ | +4 dB |
| present | MnZn ferrite | $Fe_4Co_{80}Nb_{14}B_2$ | $SiO_2$ | +6 dB |
| inven- | MnZn ferrite | $Fe_4Co_{80}Nb_{14}B_2$ | $Al_2O_3$ | +6 dB |
| tion | Sendust | $Co_{80}Cr_{10}Zr_{10}$ | $SiO_2$ | +6 dB |
|  | Sendust | $Fe_4Co_{80}Nb_{14}B_2$ | $SiO_2$ | +8 dB |
|  | Sendust | $Fe_4Co_{80}Nb_{14}B_2$ | $Al_2O_3$ | +8 dB |

As shown in Table 3, the output characteristics of each of the magnetic heads of the present invention are better than those of the conventional magnetic head.

EXAMPLE 4

Figure 4A:
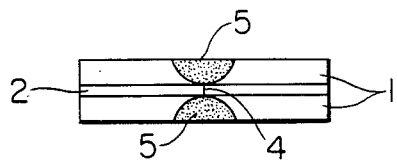
FIG. 4A is a front view of a magnetic head having a sandwich structure in which an amorphous alloy is sputtered onto a substrate to a thickness (width) substantially corresponding to a tape track, and the amorphous film is covered by another substrate according to a second embodiment of the present invention.
Figure 4B:
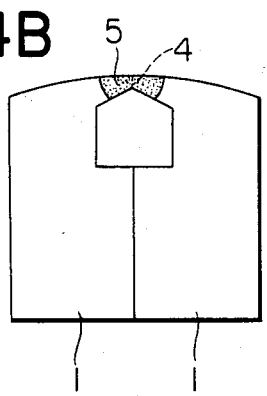
FIG. 4B is a plan view thereof.
Figure 4C:
FIG. 4C is a side view thereof.

The amorphous alloy magnetic head has an advantage over the conventional ferrite magnetic head in that the amorphous alloy has a high magnetic flux density, so that recording can be satisfactorily performed on a magnetic tape having a high coercive force. Furthermore, since the magnetic saturation of the magnetic head core tends to occur at the smallest portion of the sectional area of the magnetic head core, that is, at the gap portion, the amorphous alloy can be used at the gap portion alone to satisfactorily perform recording on a tape having a high coercive force. Referring to FIGS. 4A to 4C, an amorphous alloy 2 having a thickness which corresponds to a tape track is formed between substrates 1. The vicinity of a gap portion 4 is formed only of the amorphous alloy 2. The structure of a magnetic head thus obtained is similar to that of the magnetic head shown in FIG. 2. Notches 5 are molded of glass.

FIGS. 5A to 5C show still another embodiment in which an amorphous alloy is sputtered on a surface which slidably contacts the magnetic tape. An amorphous alloy 2 is deposited by sputtering on a mirror-polished surface of a substrate 1. After a winding window is formed, a gap portion 4 is formed and notches 5 are then molded of glass. The vicinity of the gap portion 4 comprises only the amorphous alloy having a high magnetic flux density.

FIGS. 6A and 6C show still another embodiment having a multilayer structure in which an amorphous alloy is sputtered in a gap portion. An amorphous alloy 2 is sputtered on a substrate 1 such as ferrite, and a winding window is formed. Thereafter, a gap portion 4 is formed, and notches 5 are molded of glass. The vicinity of the gap portion comprises only the amorphous alloy.

In the magnetic heads of the three types described above, the vicinity of the gap portion in which magnetic saturation easily occurs comprises only the amorphous alloy having a high magnetic flux density. Therefore, recording can be satifactorily performed even on a tape having a high coercive force.

When a signal of 5 MHz is recorded on a tape having a coercive force of 1,100 Oe and is played back, each of the magnetic heads comprising the ferrite substrate and the amorphous alloy having a saturation flux density $B_s$ of 9,500 Gausses provides an output +3 dB to +4 dB higher than the output from a magnetic head comprising an Mn-Zn ferrite substrate having a saturation flux density $B_s$ of 4,500 Gausses.

EXAMPLE 5

After a vacuum chamber was evacuated to a pressure of $3 \times 10^{-7}$ Torr, Ar gas was introduced into the vacuum chamber to a pressure of $1 \times 10^{-2}$ Torr. Amorphous alloys of the compositions shown in Table 4 were deposited on a forsterite substrate for about 5 hours. The forsterite substrate was mirror-polished and sufficiently cleaned in advance.

Figure 7:
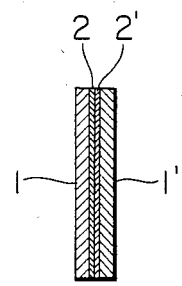
FIG. 7 is a sectional view of a dummy head which is obtained by adhering one substrate having one amorphous alloy film to another substrate having another amorphous alloy film so as to bring one amorphous alloy film into contact with the other amorphous alloy film, and which has a polished surface for slidably contacting the magnetic tape in order to measure a difference in degree of wear between the two materials.
Figure 8:
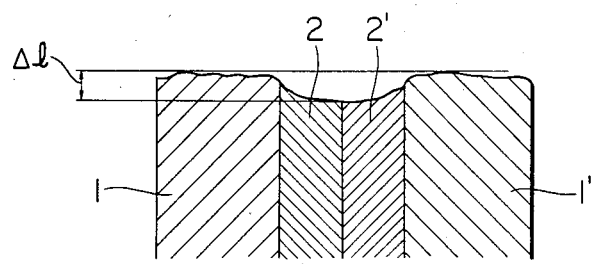
FIG. 8 is a representation showing an example of a difference in degree of wear between the two materials.

As shown in FIG. 7, two substrates 1 and 1', were prepared to have amorphous alloy films 2 and 2', respectively. These substrates 1 and 1' were adhered together so as to bring the amorphous alloy film 2 into contact with the amorphous alloy film 2'. A surface thereof which slidably contacts a magnetic tape was polished to prepare a dummy magnetic head. This dummy magnetic head was mounted on a commercially available VRT deck. A commercially available Co-doped $\gamma$-Fe$_2$O$_3$ tape was driven for 500 hours, and a difference $\Delta l$ in the degree of wear between the two materials of the head was measured. FIG. 8 shows an example of a difference in the degree of wear between the two materials. The magnetic head used in the experiment had a thickness of 420 $\mu$m and a width of 2 mm. The thickness (width) of the amorphous alloy portion which corresponded to the tape track was about 20 $\mu$m. Results are shown in Table 4.

TABLE 4

| Sample No. | Alloy composition | Difference $\Delta l$ in degree of wear ($\mu$m) |
|---|---|---|
| 1 | Co$_{95}$Zr$_5$ | −0.05 |
| 2 | Co$_{90}$Zr$_{10}$ | 0.00 |
| 3 | Co$_{85}$Nb$_{15}$ | 0.00 |
| 4 | Co$_{80}$Ti$_{20}$ | −0.05 |
| 5 | Co$_{80}$Ta$_{20}$ | 0.00 |
| 6 | Co$_{80}$Ti$_{10}$Zr$_{10}$ | 0.00 |
| 7 | Co$_{85}$Nb$_{10}$Zr$_5$ | 0.00 |
| 8 | Co$_{80}$Ti$_{10}$Ta$_{10}$ | 0.00 |
| 9 | Co$_{80}$Ni$_{10}$Zr$_{10}$ | −0.05 |
| 10 | Co$_{75}$Cr$_{10}$Mo$_{10}$Zr$_5$ | 0.00 |
| 11 | Co$_{84}$Fe$_2$Nb$_{14}$ | 0.00 |
| 12 | Co$_{80}$W$_5$Ta$_2$Zr$_3$Nb$_{10}$ | 0.00 |
| 13 | Co$_{82}$Cr$_7$Mo$_3$Zr$_8$ | 0.00 |
| 14 | Co$_{75}$Mn$_{10}$Ni$_5$Zr$_{10}$ | −0.05 |
| 15 | Co$_{85}$Fe$_2$Nb$_{10}$Hf$_3$ | −0.05 |
| 16 | Co$_{82}$Nb$_{16}$B$_2$ | −0.2 |
| 17 | Co$_{80}$Nb$_{14}$B$_6$ | −0.4 |
| 18 | Co$_{80}$Ti$_{10}$B$_{10}$ | −1.0 |
| 19 | Co$_{8085}$Zr$_{12}$Si$_3$ | −0.3 |
| 20 | Co$_{75}$Nb$_{10}$Si$_5$B$_{10}$ | −2.0 |
| 21 | Co$_{75}$Zr$_{10}$Si$_5$B$_{10}$ | −1.5 |
| 22 | Co$_{70}$Fe$_5$Si$_{15}$B$_{10}$ | −3.5 |
| 23 | Co$_{75}$Fe$_5$B$_{20}$ | −6.0 |
| 24 | Fe$_{80}$Si$_{10}$B$_{10}$ | −5.0 |
| 25 | Fe$_{80}$P$_{13}$C$_7$ | −7.0 |
| 26 | Fe$_{40}$Ni$_{40}$P$_{14}$B$_6$ | −7.0 |

Note: Sample Nos. 16 to 26 are Comparative Examples.

As may be apparent from the above results, each of the magnetic heads according to the present invention experienced a very small difference in degree of wear between the two materials thereof. Conversely, each of the magnetic heads of the Comparative Examples show a difference in degree of wear between the two materials to be more than 0.1 $\mu$m, thus resulting in impractical magnetic heads.

EXAMPLE 6

An amorphous alloy Co$_{80}$Nb$_{10}$Zr$_{10}$ was deposited on substrates shown in Table 5. The absolute wear and a difference in the degree of wear between the amorphous alloy and the respective substrate were measured by forming the above alloy-substrate layers into magnetic heads each having the dimensions shown in Example 5. As Comparative Examples, monocrystalline Mn-Zn ferrite was used to form a magnetic head. The surface of the head which slidably contacted the magnetic tape was the (2,1,1) plane. Results are shown in Table 5.

TABLE 5

| Head composition | | Wear of head after 500 hours of tape travel ($\mu$m) |
|---|---|---|
| MnZn ferrite | | 10 |
| Amorphous alloy | Substrate | |
| Co$_{80}$Nb$_{10}$Zr$_{10}$ | Forsterite | 6 (0.00) |

TABLE 5-continued

| Head composition | | Wear of head after 500 hours of tape travel ($\mu$m) |
|---|---|---|
| | substrate | |
| Co$_{80}$Nb$_{10}$Zr$_{10}$ | Barium titanate substrate | 6 (0.00) |
| Co$_{80}$Nb$_{10}$Zr$_{10}$ | Alumina substrate | 2 (−0.05) |
| Co$_{80}$Nb$_{10}$Zr$_{10}$ | Nonmagnetic Zn ferrite substrate | 10 (0.00) |
| Co$_{80}$Nb$_{10}$Zr$_{10}$ | Glass substrate | 8 (0.00) |

The numbers in parentheses indicate the value of difference $\Delta l$ ($\mu$m).

As may be apparent from the above results, each of the magnetic heads of the present invention experienced an absolute degree of wear smaller than that of the ferrite magnetic head, as well as a smaller difference in degree of wear between the two materials used to form the magnetic heads.

EXAMPLE 7

Sputtered films having compositions shown in Table 6 were exposed at a temperature of 40° C. and a relative humidity of 90 to 95% for 240 hours, and an anti-corrosion test was performed. Changes in color of the thin amorphous films were examined. Results are shown in Table 6.

TABLE 6

| Composition | Color of thin amorphous films |
|---|---|
| Co$_{85}$Ti$_5$Zr$_{10}$ | Change to light brown |
| Co$_{82}$Ti$_8$Zr$_{10}$ | Substantially no change in color |
| Co$_{80}$Ti$_{10}$Zr$_{10}$ | No change in color |
| Co$_{85}$Nb$_5$Zr$_{10}$ | Slight change to light brown |
| Co$_{82}$Nb$_8$Zr$_{10}$ | Substantially no change in color |
| Co$_{80}$Nb$_{10}$Z$_{10}$ | No change in color |
| Co$_{87}$Cr$_3$Zr$_{10}$ | Brown spots |
| Co$_{85}$Cr$_5$Zr$_{10}$ | Substantially no change in color |
| Co$_{83}$Cr$_7$Zr$_{10}$ | No change in color |
| Co$_{85}$Nb$_{15}$ | Substantially no change in color |
| Co$_{90}$Zr$_{10}$ | Extreme change to dark brown |
| Co$_{80}$Mo$_{10}$Zr$_{10}$ | Change to dark brown |
| Co$_{85}$Ta$_8$Zr$_7$ | No change in color |

According to the results shown above, a practical amorphous alloy contains more than 5% of Cr and more than 8% of Ti and Nb, respectively. Therefore, when resistance to corrosion is considered Cr, Ti and Nb are preferably included in a proper amount.

EXAMPLE 8

The electrical characteristics of magnetic heads according to the present invention were compared with those of the conventional Mn-Zn ferrite VTR head.

Each of the magnetic heads according to the present invention was prepared in the following manner. Thin amorphous alloy films of the compositions shown in Table 7 were formed by sputtering on a forsterite substrate in an Ar gas atmosphere at a pressure of 1×10$^{-2}$ Torr. Each of the obtained amorphous films had a thickness of 6 $\mu$m. Thin SiO$_2$ films each having a thickness of 0.1 $\mu$m were sputtered on the thin amorphous alloy films, respectively. Subsequently, thin amorphous alloy films each having a thickness of 6 $\mu$m were formed by sputtering on the thin SiO$_2$ films, respectively. Thin SiO$_2$ films each having a thickness of 0.1 $\mu$m were again formed by sputtering on the secondly formed amorphous alloy films. The above operation was repeated to form a front core of a sandwich structure having a thickness of 30.4 μm which corresponded to a tape track width. The front core was then adhered to a multilayer (Mn-Zn ferrite) back core to prepare a magnetic head shown in FIG. 9.

Figure 9:
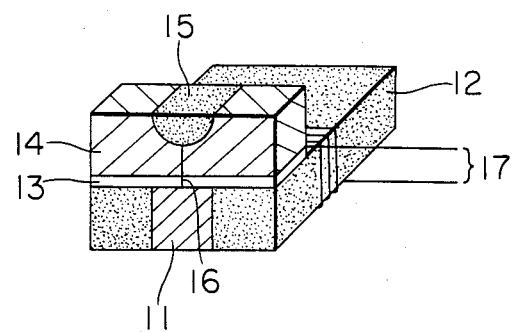
FIG. 9 is a perspective view of a magnetic head according to a fifth embodiment of the present invention.

Referring to FIG. 9, reference numerals 11 and 12 respectively denote a forsterite portion and an Mn-Zn ferrite portion. The forsterite portion 11 and the Mn-Zn ferrite portion 12 constitute a multilayer back core. Reference numeral 13 denotes a thin amorphous alloy film; 14, a forsterite substrate; 15, a magnetic gap bonding glass portion for a magnetic gap; 16, a magnetic gap; and 17, a winding.

A surface of the magnetic head which slidably contacts the magnetic tape was polished. Then, the obtained magnetic head was mounted on a rotary cylinder of a VTR.

The electrical characteristics of various amorphous alloy magnetic heads having the same structure described above according to the present invention were compared with those of the above-mentioned monocrystalline Mn-Zn ferrite magnetic head whose tape contact surface comprises the (2,1,1) plane of the single crystal under the same conditions as used for the monocrystalline Mn-Zn ferrite magnetic head. A metal tape having a coercive force $H_c$ of 1,100 Oe was used as a test tape. A reference signal of 8 MHz was recorded on the test tape and was played back. The relative ratio of recording sensitivity to playback sensitivity of the Mn-Zn monocrystalline ferrite head was defined as 0 dB. The recording/playback sensitivities of the magnetic head cores were measured with reference to the recording/playback sensitivity of the Mn-Zn monocrystalline ferrite head, and results are shown in Table 7. In order to measure the slidable contact noise, the noise level of the monocrystalline Mn-Zn ferrite for the 8-MHz component was defined as 0 dB, using a blank magnetic tape. The noise levels of the magnetic heads according to the present invention were measured and are shown in Table 7.

TABLE 7

| Sample No. | Magnetic head core | Recording/ playback sensitivity | Slidable contact noise |
|---|---|---|---|
| 1 | (2,1,1) plane of monocrystalline MnZn ferrite | 0 dB | 0 dB |
| 2 | $Co_{90}Zr_{10}$ | 0 dB | +2 dB |
| 3 | $Co_{82}Ti_8Zr_{10}$ | +1 dB | +3 dB |
| 4 | $Co_{82}Cr_7Mo_3Zr_8$ | +6 dB | −4 dB |
| 5 | $Co_{80}Ni_{10}Zr_{10}$ | +4 dB | −4 dB |
| 6 | $Co_{85}Nb_{15}$ | +3 dB | 0 dB |
| 7 | $Co_{84}Fe_2Nb_{14}$ | +5 dB | −6 dB |
| 8 | $Co_{84}Fe_1Nb_{10}Zr_5$ | +5 dB | −3 dB |
| 9 | $Co_{81}Mn_1Cr_{10}Zr_8$ | +5 dB | −4 dB |
| 10 | $Co_{84}W_6Zr_{10}$ | +2 dB | −4 dB |
| 11 | $Co_{80}Ti_{20}$ | 0 dB | −1 dB |
| 12 | $Co_{80}Ta_{20}$ | +1 dB | 0 dB |
| 13 | $Co_{85}Ta_{10}Zr_5$ | +2 dB | −3 dB |

As may be apparent from Table 7, the recording/playback sensitivity of an amorphous alloy head including proper amounts of Fe, Ni, Cr, Mo, W and Mn is higher than that of the Mn-Zn monocrystalline ferrite head, and the slidable contact noise of the above amorphous alloy head is lower than that of the Mn-Zn monocrystalline ferrite head. The resistance to wear of the magnetic head according to the present invention is equal to or higher than that of the conventional ferrite head, as may be apparent from Table 5. One of the features of the magnetic head according to the present invention is the thin metal film. Therefore, the head core of the metal magnetic head has the electromagnetic transduction frequency characteristics which are better than those of the head core of the conventional ferrite head, and also has a high saturation flux density $B_s$. The magnetic head according to the present invention is suitable for a metal tape which requires high frequency magnetic characteristics. The various characteristics of the typical magnetic heads according to the present invention are shown in table 8 in comparison with those of the conventional Mn-Zn ferrite head. In this case, the thickness of the ferrite core is 100 μm, while that of the amorphous alloy core is 3 μm.

TABLE 8

| Core material | | Mn—Zn ferrite | $Co_{82}Cr_7Mo_3Zr_8$ | $Co_{82}Fe_4Nb_{14}$ |
|---|---|---|---|---|
| $B_s$ (Gauss) | | 4000 | 7000 | 8500 |
| $H_c$ (Oe) | | 0.05 | 0.02 | 0.04 |
| Permeability (μ) | 1 MHz | 5000 | 10000 | 5000 |
| | 5 MHz | 700 | 7000 | 4000 |
| | 20 MHz | 200 | 3000 | 2000 |

In summary, the magnetic head according to the present invention has the following features.

(1) The saturation flux density $B_s$ of the magnetic head of the present invention is higher than that of the conventional ferrite head.

(2) The resistance to wear of the magnetic head according to the present invention is equal to or higher than that of the conventional ferrite head. It is noted that a conventional amorphous alloy head has a resistance to wear lower than that of the conventional ferrite head.

(3) The slidable contact noise can be decreased, as compared with the conventional ferrite head, by adding a proper additive to adjust the magnetostriction.

(4) The recording/playback sensitivity and the frequency characteristics of the magnetic head according to the present invention are higher than those of the conventional ferrite head.

(5) A head having a narrow track can be easily manufactured. Furthermore, chipping at the time of manufacture does not occur, unlike in the process for manufacturing the conventional ferrite head.

What is claimed is:

1. A magnetic head which slideably contacts a magnetic recording medium, said head comprising a core including a substrate having high resistance to wear, a thin amorphous alloy film formed on a major surface of the substrate and forming at least part of a magnetic path, and a magnetic gap provided at a portion of said thin amorphous alloy film which is adjacent to the magnetic recording medium, wherein the thin amorphous alloy film has a composition of $Co_aM_bT_c$ wherein $70 \leq a \leq 95$, $0 \leq b \leq 20$, $5 \leq c \leq 20$ and $a+b+c=100$, where M is at least one metal selected from the group consisting of Fe, Ni, Cr, Mo, W and Mn, and T is at least one metal selected from the group consisting of Ti, Zr, Hf, Nb and Ta.

2. A magnetic head according to claim 1, wherein a portion of said core which slidably contacts the magnetic recording medium comprises the amorphous alloy.

3. A magnetic head according to claim 1, wherein the thin amorphous alloy film is located at least in a portion adjacent a magnetic gap of the magnetic core.

4. A magnetic head according to claim 1, wherein at least one thin ceramic film having excellent resistance to wear and a thickness smaller than a thickness of said thin amorphous alloy film is sandwiched between adjacent ones of a plurality of said thin amorphous alloy films.

5. A magnetic head according to claim 1, wherein said thin amorphous alloy film is sandwiched between a pair of substrates.

6. A magnetic head according to claim 1, wherein said substrate comprises ferrite.

7. A magnetic head according to claim 1, wherein said substrate comprises Sendust.

8. A magnetic head which slideably contacts a magnetic recording medium said head comprising a core including a substrate having high resistance to wear, a thin amorphous alloy film formed on a major surface of the substrate and forming at least part of a magnetic path, and a magnetic gap provided at a portion of said thin amorphous alloy film which is adjacent to the magnetic recording medium, wherein the thin amorphous alloy film has a composition of $Co_xNb_yM'_zT'_u$ wherein $75 \leq x \leq 92$, $8 \leq y \leq 20$, $0.1 \leq z \leq 10$, $0 \leq u \leq 5$, and $x+y+z+u=100$, where M' is at least one material selected from the group consisting of Fe, Ni, Cr, Mo, W and Mn, and T' is at least one material selected from the group consisting of Zr, Ta and Ti.

* * * * *